(12) United States Patent
Kelly et al.

(10) Patent No.: US 12,398,792 B2
(45) Date of Patent: Aug. 26, 2025

(54) SELECTABLE TORQUE PATH TORQUE CONVERTER

(71) Applicants: EXEDY GLOBALPARTS CORPORATION, Belleville, MI (US); MEANS INDUSTRIES, INC., Saginaw, MI (US)

(72) Inventors: Cody Kelly, Ypsilanti, MI (US); Bryant Grytzelius, Canton, MI (US); Kenneth Walega, Northville, MI (US); Ali Merat, Sausalito, CA (US); Spencer Kane, Chesaning, MI (US); Todd Andrzejewski, Saginaw, MI (US); Joshua Hand, Midland, MI (US)

(73) Assignees: Exedy GlobalParts Corporation, Belleville, MI (US); Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/546,929

(22) PCT Filed: May 1, 2023

(86) PCT No.: PCT/US2023/020570
§ 371 (c)(1),
(2) Date: Aug. 17, 2023

(87) PCT Pub. No.: WO2023/212397
PCT Pub. Date: Nov. 2, 2023

(65) Prior Publication Data
US 2024/0084890 A1    Mar. 14, 2024

Related U.S. Application Data

(60) Provisional application No. 63/336,946, filed on Apr. 29, 2022.

(51) Int. Cl.
*F16H 45/00* (2006.01)
*F16D 27/115* (2006.01)
*F16D 41/12* (2006.01)

(52) U.S. Cl.
CPC ............ *F16H 45/00* (2013.01); *F16D 27/115* (2013.01); *F16D 41/125* (2013.01); *F16H 2045/002* (2013.01)

(58) Field of Classification Search
CPC ...... F16H 45/00–2045/0294; F16D 41/00–32; F16D 21/00–08
See application file for complete search history.

(56) References Cited

U.S. PATENT DOCUMENTS 3,040,852 A    6/1962    Svenson
3,810,362 A *  5/1974    Finke ...................... F16H 61/58
                                                          60/362

(Continued)

FOREIGN PATENT DOCUMENTS

GB          2193766 A *  2/1988    ............. F16H 45/00

*Primary Examiner* — James J Taylor, II
(74) *Attorney, Agent, or Firm* — Honigman LLP; Eric J. Sosenko; Jonathan P. O'Brien

(57) ABSTRACT

An architecture for coupling an output member from a prime mover to an input member of a device to be driven. The architecture includes a torque transfer device defining an indirect coupling for transferring torque therethrough, a direct drive connection member providing a direct coupling for transferring torque therethrough, and a dynamically controllable clutch that selectively and rotationally drives either the torque transfer device or the direct drive connection member. The torque transfer device is rotatably disconnected from the dynamically controllable clutch and undriven when the dynamically controllable clutch is driving the direct drive connection member.

15 Claims, 3 Drawing Sheets

(56) References Cited

U.S. PATENT DOCUMENTS

| | | | | |
|---|---|---|---|---|
| 4,548,101 | A | * | 10/1985 | Akashi ..................... F16H 3/10 |
| | | | | 74/330 |
| 4,574,925 | A | | 3/1986 | Nishimura et al. |
| 5,310,033 | A | | 5/1994 | Shibayama |
| 5,789,823 | A | * | 8/1998 | Sherman ................. F16H 61/62 |
| | | | | 290/46 |
| 9,157,495 | B2 | * | 10/2015 | Frait ....................... B60K 6/387 |
| 9,494,220 | B2 | * | 11/2016 | Gibbs ..................... F16H 45/02 |
| 11,161,406 | B2 | * | 11/2021 | Matsuoka ............... F16H 45/02 |
| 11,603,925 | B1 | * | 3/2023 | Lee ....................... F16H 61/143 |
| 2003/0186768 | A1 | | 10/2003 | Evans et al. |
| 2008/0227597 | A1 | | 9/2008 | Povirk et al. |
| 2021/0332874 | A1 | * | 10/2021 | Matsuoka ............... F16H 45/02 |
| 2023/0075440 | A1 | * | 3/2023 | Braun ..................... F16H 3/005 |

* cited by examiner

SELECTABLE TORQUE PATH TORQUE CONVERTER

CROSS REFERENCE TO RELATED APPLICATION

This application claims the benefit of U.S. provisional patent application No. 63/336,946, filed Apr. 29, 2022, the entire contents of which are incorporated by reference herein.

BACKGROUND

1. Field of the Invention

The present invention generally relates to powertrains incorporating a torque converter and, more particularly, to a new architecture of a powertrain system, as might be used in the powertrain of a motor vehicle or another driven device, that incorporates a torque converter. More specifically, the present invention relates to a new architecture of a powertrain system that allows for the selecting of a torque path through the powertrain.

2. Description of Related Art

Today, the automotive industry is increasingly moving away from internal combustion engine (ICE) vehicles and toward electric vehicles. While the technology is improving, one drawback of an all-electric vehicle (EV) is the current limitation on battery technology and, resultantly, the mileage range of such vehicles. Drivers who have mileage needs beyond the range of a typical all-electric vehicle must generally choose between stopping for extended periods of time to recharge the battery or owning a second vehicle, such as an ICE vehicle, that does have an extended driving range.

Hybrid vehicles (HV) offer a blend of ICE vehicle and EV. During use, hybrid vehicles alternate between the ICE and an electric motor to power the vehicle. The net effect of this combined usage is an effective gas mileage that is lower than an EV, but higher than an ICE vehicle. Plug-in, hybrid electric vehicles (PHEV) run on electricity as their primary power source, but will utilize a combustion engine as a backup power source to extend the range of the vehicle.

While the above discussion concerns the powertrains of vehicles, powertrains can also be used in other scenarios where a device requires a rotational input for its operation. One of many other scenarios includes the driving of a gear reduction unit. The output of the gear reduction unit itself may be coupled to other devices also having a need for a rotational input.

A torque converter is a component of the powertrain that couples the prime mover (ICE, electric motor (EM) or ICE/EM combination) of the powertrain with the input of the driven device, e.g. a transmission, a gear reduction mechanism or other device. In a simplistic description, a torque converter uses a hydrodynamic circuit to multiply the input torque and transmit the increased torque as an output torque to the input of the driven device.

The torque converter includes front and rear covers, which together define a shell having an internal chamber where the hydrodynamic circuit is provided. Generally, the output of the prime mover causes rotation of the shell. Rotation of the shell in turn causes rotation of an impeller within the shell. Resultantly, rotation of the impeller directs a hydrodynamic fluid toward a turbine, where the force imparted on the turbine by the fluid rotationally drives the turbine. From the turbine, the fluid is directed radially inward and subsequently axially back toward the impeller. A stator, positioned between the turbine and the impeller, further redirects the fluid so as to efficiently transfer the fluid back to the impeller, thereby multiplying the torque being transferred. Because this circuit is hydrodynamic, a speed differential (known as slip) can occur between the input (impeller) and the output (turbine) sides of the torque converter.

Having both the ability to multiply torque and provide slip is the purpose and function of the torque converter. Torque multiplication is beneficial when launching a vehicle from a dead stop or when towing. However, there are times when it is beneficial to lock-up the torque converter and eliminate slip, a situation where the front cover (the input of the torque converter) is locked with and directly driving the output of the torque converter. An instance when lock-up is beneficial is when cruising down the road at a steady state. The lock-up condition is achieved by including a lock-up clutch within the torque converter.

During the lock-up condition, all the components of the torque converter rotate together. Torque is transferred through the torque converter not by the hydraulic coupling of the impeller, turbine and stator, but rather by interconnection of the shell/front cover, internal lock-up clutch, output hub and output shaft.

While this lock-up connection allows for better efficiency than the hydrodynamic circuit allows, inefficiencies in the drivetrain exist because the components of the torque converter continue to rotate during lock-up. These inertial losses occur regardless of whether the powertrain incorporates an ICE, EM or ICE/EM as the prime mover. Additionally, the maximum rotational speed of the torque converter is a limiting factor on the rotational speed for operation of the driveline.

SUMMARY

In overcoming the drawbacks and other limitations of the known technologies, in one aspect the present invention provides an architecture whereby the coupling between the output of a prime mover and a driven device is switchable between two different torque flow paths, one including an indirect coupling and one excluding the indirect coupling.

Accordingly, in one aspect the invention provides an architecture for coupling the output member from a prime mover to the input member of a device to be driven thereby.

In another aspect, the architecture includes an input member configured to be connected to the output member of the prime mover; an output member configured to be connected to the input member of the device to be driven; a torque transfer device defining an indirect coupling transferring torque therethrough, the torque transfer device having a device output member connected to the output member of the architecture; a direct drive connection member providing a direct coupling transferring torque therethrough, the direct drive connection being connected to the output member of the architecture; and a dynamically controllable clutch connected to the input member and being selectively and alternately coupled to rotationally drive one of the torque transfer device and the direct drive connection member; whereby when the dynamically controllable clutch is coupled to the torque transfer device, the torque transfer device is rotatably driven by the input member and the output member of the architecture is rotatably driven by the torque transfer device, when the dynamically controllable clutch is coupled to the direct drive connection member the direct drive connection member is driven by the input member, the output member is rotatably driven by the direct drive connection member and the torque transfer device is rotatably disconnected from the input member and undriven.

In a further aspect, the torque transfer device is a torque converter including an impeller and a turbine defining a fluid circuit for driving the turbine by the impeller during operational conditions where torque multiplication and/or slip are desired.

In an additional aspect, the dynamically controllable clutch includes an actuator, a first set of locking elements and a second set of locking elements, In first condition the actuator engages the first set of locking elements with an indirect drive connection member and rotationally driving the torque transfer device. In a second condition, the actuator engages the second set of locking elements and rotationally drives the direct drive connection member. The first set of locking elements are disengaged from the indirect connection member in the second condition, and the second set of locking elements are disengaged from the direct drive connection member in the first condition.

In still another aspect, the first and second sets of locking elements mechanically engage with the indirect drive connection member and the direct drive connection member, respectively.

In yet a further aspect, an electric friction clutch is coupled between the dynamically controllable clutch and an input of the torque transfer device.

In an additional aspect, the electric friction clutch is configured to selectively and frictionally coupled the torque transfer device to a portion of the dynamically controllable clutch and to cause the torque transfer device to rotate at a speed within a predetermined speed differential relative to a rotational speed of the input member or the direct drive connection member, thereby permitting re-engagement of the torque transfer device and the input member via the dynamically controllable clutch over the operational range.

In yet another aspect, the electric friction clutch includes a first set of friction plates and a second set of friction plates. A translator is configured to compress the first and second sets of friction plates against one another, and an actuator configured to cause the translator to compress the first and second sets of friction plates In still a further aspect, the one of the first and second sets of friction plates is supported by the dynamically controllable clutch and rotatable therewith, and the other of the first and second sets of friction plates is supported by the indirect drive connection member and rotatable therewith.

In another aspect, the invention provides an architecture having an input member configured to be connected to the output member of the prime mover; an output member configured to be connected to the input member of the device to be driven; a torque converter having an impeller and a turbine defining a fluid coupling for transferring torque therethrough, the torque converter having an output member connected to the output member of the architecture; a direct drive connection member connected to the output member of the architecture and defining a mechanical coupling for transferring torque to the output member of the architecture; and a dynamically controllable clutch connected to the input member and being selectively and alternately coupled to rotationally drive one of the torque converter and the direct drive connection member. When the dynamically controllable clutch is coupled to the torque converter, the torque converter is rotatably driven by the input member and the output member of the architecture is rotatably driven by an output of the torque converter, when the dynamically controllable clutch is coupled to the direct drive connection member the direct drive connection member is driven by the input member, the output member is rotatably driven by the direct drive connection and the torque converter is rotatably disconnected from the input member and undriven.

In yet another aspect, the dynamically controllable clutch includes an actuator, a first set of locking elements and a second set of locking elements. In a first condition the actuator mechanically engages the first set of locking elements with an indirect drive connection member and rotationally drives the torque converter. In a second condition, the actuator mechanically engages the second set of locking elements and rotationally drives the direct drive connection member. The first set of locking elements are disengaged from the indirect connection member in the second condition, and the second set of locking elements are disengaged from the direct drive connection member in the first condition.

In still a further aspect, an electric friction clutch is coupled between the dynamically controllable clutch and an input of the torque converter.

In an additional aspect, the electric friction clutch is configured to selectively and frictionally couple the torque converter to a portion of the dynamically controllable clutch and to cause the torque converter to rotate at a speed within a predetermined speed differential relative to a rotational speed of the input member or the direct drive connection member, thereby permitting re-engagement of the torque converter and the input member via the dynamically controllable clutch over an operational range.

In another aspect, the electric friction clutch includes a first set of friction plates and a second set of friction plates, a translator configured to compress the first and second sets of friction plates against one another, and an actuator configured to cause the translator to compress the first and second sets of friction plates In yet a further aspect, the one of the first and second sets of friction plates is supported by the dynamically controllable clutch and rotatable therewith, the other of the first and second sets of friction plates is supported by the indirect drive connection member and rotatable therewith.

In another aspect, the architecture, for coupling an output member from a prime mover to an input member of a device to be driven thereby, includes an input member configured to be connected to the output member of the prime mover; an output member configured to be connected to the input member of the device to be driven; a torque converter having an impeller and a turbine defining a fluid coupling for transferring torque therethrough, the torque converter having an output member connected to the output member of the architecture; a direct drive connection member connected to the output member of the architecture and defining a mechanical coupling for transferring torque to the output member of the architecture; a dynamically controllable clutch connected to the input member and being selectively and alternately mechanically coupled to rotationally drive one of the torque converter and the direct drive connection member; an electric friction clutch coupled between the dynamically controllable clutch and an input of the torque converter, the electric friction clutch including a first set of friction plates and a second set of friction plates, a translator configured to compress the first and second sets of friction plates against one another, one of the first and second sets of friction plates being supported by the dynamically controllable clutch and rotatable therewith, the other of the first and second sets of friction plates being supported by the indirect drive connection member and rotatable therewith; and whereby when the dynamically controllable clutch is coupled to the torque converter, the torque converter is rotatably driven by the input member and the output member of the architecture is rotatably driven by an output of the torque converter, when the dynamically controllable clutch is coupled to the direct drive connection member the direct drive connection member is driven by the input member, the output member is rotatably driven by the direct drive connection and the torque converter is rotatably disconnected from the input member and undriven.

In further aspect, the electric friction clutch is configured to selectively and frictionally couple the torque converter to a portion of the dynamically controllable clutch and to cause the torque converter to rotate at a speed within a predetermined speed differential relative to a rotational speed of the input member or the direct drive connection member, thereby permitting re-engagement of the torque converter and the input member via the dynamically controllable clutch over an operational range.

In an additional aspect, the dynamically controllable clutch includes an actuator, a first set of locking elements and a second set of locking elements. In a first condition the actuator mechanically engages the first set of locking elements with an indirect drive connection member and rotationally driving the torque converter. In a second condition, the actuator mechanically engages the second set of locking elements and rotationally drives the direct drive connection member. The first set of locking elements are disengaged from the indirect connection member in the second condition, and the second set of locking elements are disengaged from the direct drive connection member in the first condition.

Further objects, features and advantages of this invention will become readily apparent to persons skilled in the art after review of the following description, including the claims, and with reference to the drawings that are appended to and form a part of this specification.

DETAILED DESCRIPTION

Figure 1:
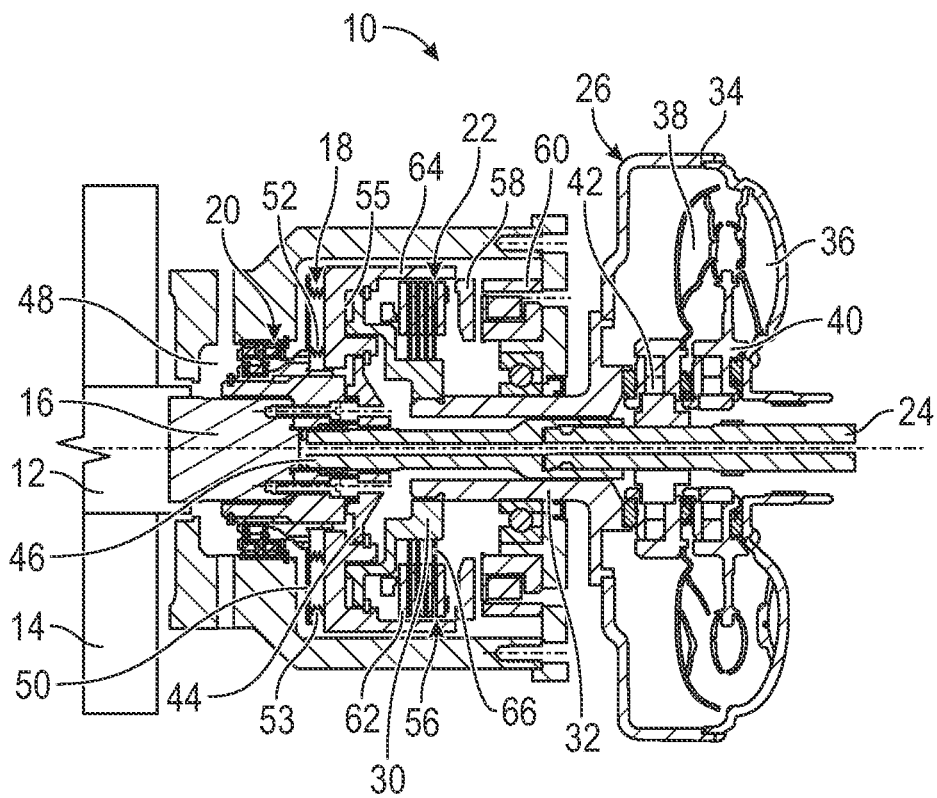
FIG. 1 is a schematic illustration of a powertrain system embodying the principles of the present invention.
Figure 2:
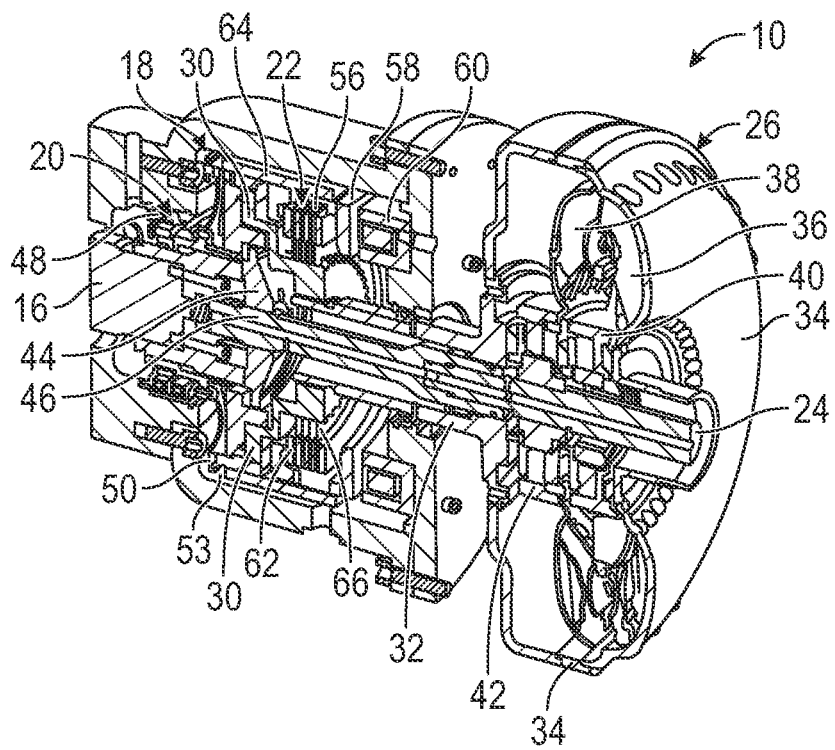
FIG. 2 is a perspective, cut-away view of a powertrain system embodying the principles of the present invention.
Figure 3:
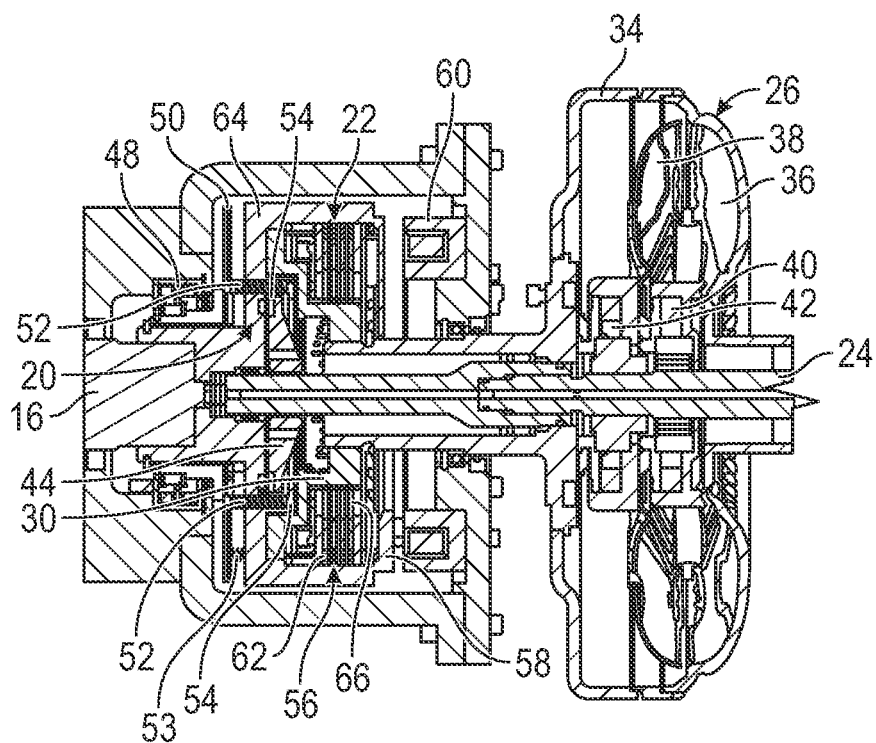
FIG. 3 is cross-sectional view of a powertrain system embodying the principles of the present invention in a state for directly driving the output member of the system.

The new architecture of a powertrain system disclosed herein allows for alternate selection between two torque flow paths: (1) an indirect flow path utilizing a torque converter and (2) a direct-drive flow path. With the direct-drive flow path, the new architecture completely bypasses the torque converter and directly drives the output member of the architecture, which is configured for connecting to the input of a driven device, such as a transmission, a gear reduction unit or other device. In the new architecture, selecting between the two torque paths is achieved using a dynamic controllable clutch (DCC).

When the direct-drive torque path is no longer desired, the new architecture allows for re-connecting and re-establishing of the indirect torque flow path, the flow path through the torque converter. This reconnection may be performed throughout the entire operational speed range of the system. In this regard, an electric friction clutch (EFC) is used to bring the rotational speed of the torque converter to within a specified speed differential with the prime mover (e.g. an electric motor), allowing the dynamic controllable clutch to seamlessly re-establish the indirect torque flow path through the torque converter.

Referring now to the drawings, a new architecture for a powertrain system is shown therein and generally designated at 10. Torque is provided to the system 10 from the output member 12 a prime mover 14, such as an internal combustion engine (ICE), electric motor (EM) or other device, to an input member 16 of the system 10. From the input member 16, torque is transferred to a selectable switching device 18, which is a unit incorporating both a dynamic controllable clutch 20 and an electric friction clutch 22. The switching device 18 in turn causes the torque to be transmitted to an output member 24 of the system 10, which may be coupled to or provided as the input of device that is to be driven. In transferring the torque, the switching device 18 can transmit the torque to the system's output member 24 indirectly through a torque converter 26 or directly through a mechanical connection that completely by-passes the torque converter 26. Selection between the two torque paths is achieved using the dynamic controllable clutch 20 of the switching device 18.

When transferring torque through the torque converter 26 in the indirect mode of operation, torque flows from the dynamic controllable clutch 20 through an "indirect drive" connection element 30 to an input hub 32 of the torque converter 26. Thereafter, torque is transferred by way of the torque converter's shell 34 to an impeller 36. The impeller 36 is fluidly coupled with a turbine 38 and a stator 40 to multiply the torque. From the turbine 38, torque is transmitted to a one-way clutch 42, which will operate in a lock-up condition to drive the system's output member 24 and the input member (not shown) of the driven device (not shown). The fluid coupling of the torque converter is an indirect coupling in that a rigid, fixed connection is not established thereby.

When transferring torque in the direct mode of operation, torque flows from the dynamic controllable clutch 20 to a "direct drive" connection element 44, which is coupled to an intermediate output member 46. The intermediate output member 46 is in turn coupled to the system's output member 24 and the input member of the driven device. In the direct mode of operation, the indirect drive connection element 30 is not driven and the torque converter 26 is completely by-passed. No torque is inputted into the torque converter 26. The one-way clutch 42 of the torque converter 26, which is located between the turbine 38 and system's output member 24, operates in an over-running condition. Accordingly, no components of the torque converter 26 (input hub 32, shell 34, the impeller 36, turbine 38 or stator 40) are driven or rotate during direct mode operation and no losses occur as a result thereof.

With existing technology, in order to by-pass the fluid coupling between the impeller and turbine, the output member is mechanically coupled to the rotating shell of the torque converter. This is achieved using a piston/clutch assembly provided internally of the torque converter. When driven in this manner, losses occur since the shell, impeller, turbine and stator all continue to be driven in rotation.

With the present architecture, the internal piston/clutch assembly (the lockup clutch) of the torque converter is removed and the switching device 18 is added upstream of the torque converter 26. As a result, the entire torque converter inertia can be avoided in the direct drive mode of operation.

While discussed herein in combination with a torque converter 26, the architecture of the present invention may be implemented in applications utilizing torque transfer devices other than torque converters. For example, another device, such as a fluid coupling device, hydrostatic coupling, or other torque transfer devices could be used in place of the torque converter 26.

The dynamic controllable clutch 20 operates such that torque imposition results from either an engagement or non-engagement of locking elements 54, 55 associated with the dynamic controllable clutch 20. The dynamic controllable clutch 20 includes an actuator 48 that is movable between first and second positions. The actuator 48, through a spring plate 50 and springs 52, 52, acts on the locking elements 54, 55 to couple the output member 12 from the prime mover 14 to the system output member 24 through either the indirect drive connection element 30 or the direct drive connection element 44.

Figure 4:
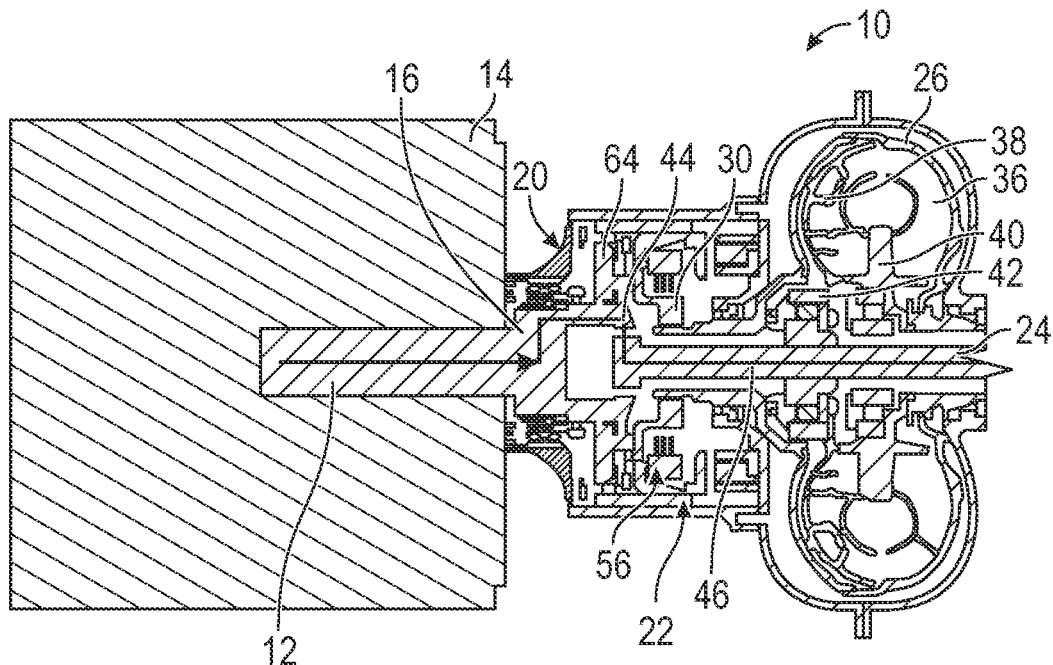
FIG. 4 is schematic illustration depicting the torque flow path through the powertrain system during the direct drive mode of operation.
Figure 5:
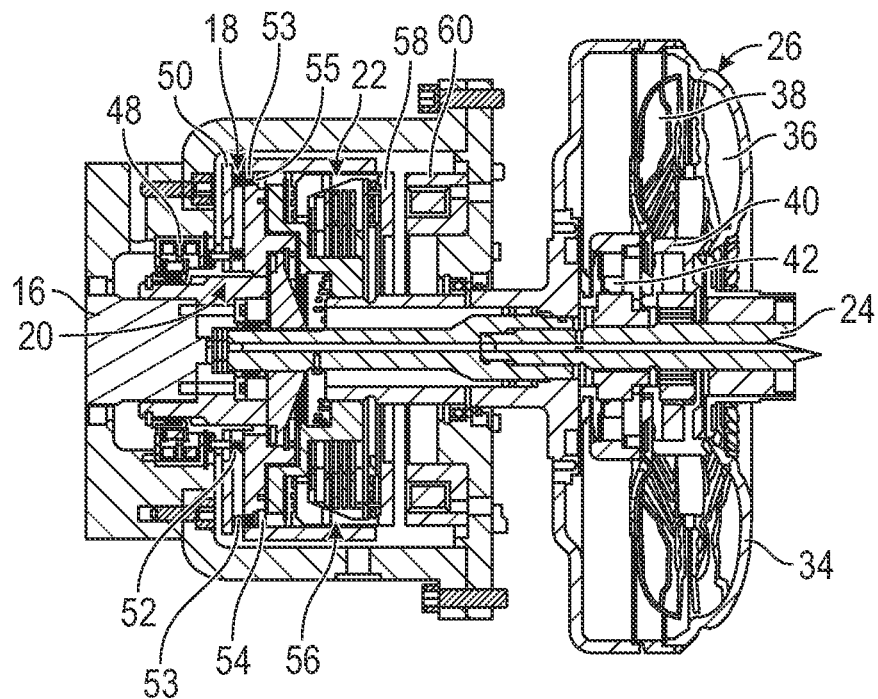
FIG. 5 is cross-sectional view of a powertrain system embodying the principles of the present invention in a state for indirectly driving the output member of the system.
Figure 6:
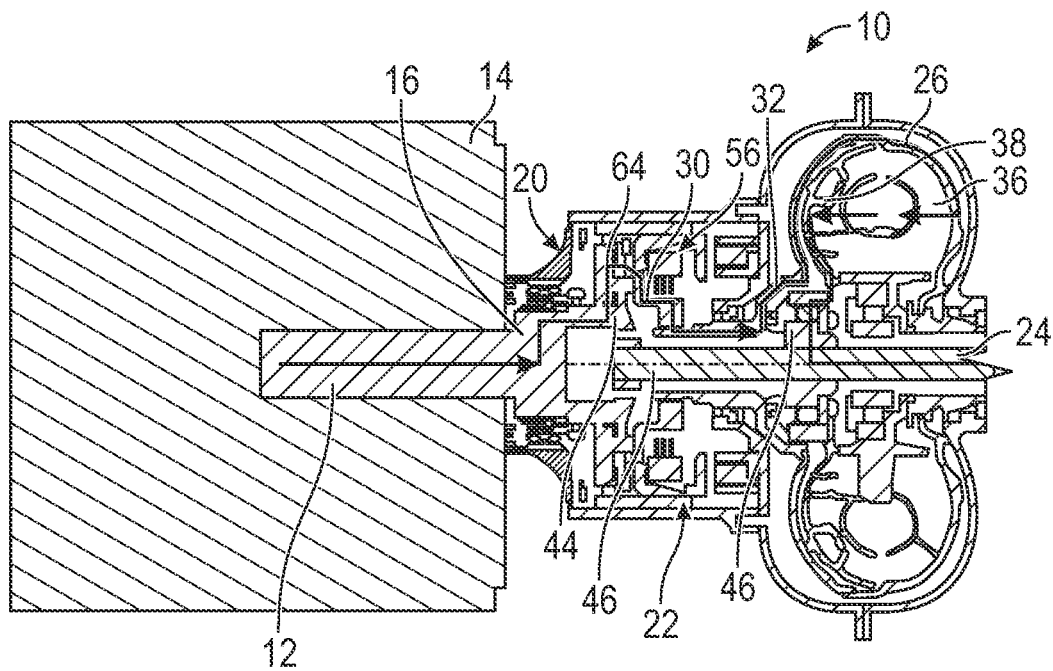
FIG. 6 is schematic illustration depicting the torque flow path through the powertrain system during the indirect mode of operation.

For example, when the actuator 48 is in a first position, locking elements 54 associated with the direct drive connection element 44 are coupled with the input member 16, and therefore the output member 12 of the prime mover 14, to the system output member 24 along the torque flow path that is as outlined in FIG. 4. When the actuator 48 is in a second position, the locking elements 55 associated with the indirect drive connection element 30 couple the input member 16 to the torque converter 26 and to the system output member 24 along the torque flow path depicted in FIG. 6.

The actuator 48 is a linear actuator acting on the spring plate 50. The springs 52, 53 engage the respective locking elements 54, 55 of the direct and indirect drive connection elements 44, 30 wherein axial movement of the spring plate 50 moves the respective locking elements 54, 55 between engagement and disengagement with the two connection elements 30, 44. The locking elements 54, 55 associated with the direct drive connection element 44 and the indirect drive connection element 30 mechanically couple the input member 16 to the system output member 24 in at least one direction about the rotational axis.

Thus, the direct drive connection element 44 includes a first set of locking elements 54 and the indirect drive connection element 30 includes a second set of locking elements 55, the latter of which are radially spaced outward from the locking elements 54 of the direct drive connection element 44. As noted above, the second position of the actuator 48 couples the input member 16 to system output member 24 through the torque converter 26 and the first position of the actuator 48 couples the input member 16 to the system output member 24 while bypassing the torque converter 26. Accordingly, the actuator 48 movement locks the input member 16 to the system output member 24 through the direct drive connection element 44 while simultaneously unlocking the torque converter 26 from the input member 16 through the indirect drive connection element 30 and vice versa.

While the switching device 18 is directly coupling the input member 16 to the system output member 24, no rotational input is provided to the torque converter 26, and the torque converter 26 may cease to rotate. To enable smooth reconnecting of the torque converter 26 with the input member 16, and the output member 12 of the prime mover 14, over the operational speed range of the system, the electric friction clutch 22 is used.

When desiring to switch from the direct drive mode of operation to the indirect drive mode (while the switching device 18 is still transmitting torque through the direct drive connection element 44 via the dynamic controllable clutch 20), the electric friction clutch 22 is used to bring the shell 34, and therefore the impeller 36, of the torque converter 26 up to a speed that is within a specified speed differential range relative to the rotational speed of the input member 16. With the shell 34 rotating at a speed in the specified range, the dynamic controllable clutch 20 can smoothly be re-engaged with the indirect drive connection element 30.

The electric friction clutch 22 is an electromagnetic clutch including a friction pack 56 having friction plates that are used to engage input and output members of the clutch 22, like a hydraulically actuated, multi-plate, wet friction clutch. The electric friction clutch 22 includes the friction pack 56, a translator 58 having a translator piston and a translator plate, and a stator 60 having a stator core and a stator coil. The friction pack 56 includes a first set of friction plates 62 that are connected to the translator piston and to an element or bell 64 of the dynamic controllable clutch 20 that is connected to the input member 16 and always rotating. The friction pack 56 also includes a second set of friction plates 66 that are coupled to the indirect drive connection element 30 and input hub 32 of the torque converter 26. The stator 60 of the electric friction clutch 22 is axially fixed in position and the translator 58 is axially movable. When the translator piston moves toward the friction pack 56 and away from the stator 60, the friction plates 62, 66 are compressed together.

Once the friction plates 62, 66 are compressed, friction between the two sets of friction plates carries torque and, consequently, a power flow path extends through the input 16, dynamic controllable clutch 20, the friction pack 56, the indirect connection 30, the input hub 32 and the torque converter 26. The establishment of this power flow path through the friction pack 56 initiates rotation of the torque converter 26 and synchronizes the rotational speed of the torque converter 26 with the rotational speed of input member 16, all while the system output member 24 is still being driven by the direct drive connection element 44 and shortly before engaging/re-engaging the indirect drive connection element 30 with the dynamically controllable clutch 20. This power flow path is similar to the torque flow path seen in FIG. 6, but passes through the friction pack 56 instead of the locking elements 55 associated with the indirect drive connection element 30 and does not drive the input shaft (6).

As seen from the above discussion, the dynamic controllable clutch 20 enables selection between multiple torque path and the electric friction clutch 22 allows the torque converter 26 to be synchronized and re-engaged with to the input member 16 throughout the operating speed range of the system.

The illustrated dynamic controllable clutch 20 is a 2-position device and features a one-way clutch in one of its torque path selection positions. In an alternative construction, a dynamic controllable clutch 20 with more than two positions (e.g. a 3-position dynamic controllable clutch) could be used.

The mechanics of the dynamic controllable clutch 20 can allow it to function like a one-way clutch (if the locking elements 54, 55 are designed to only engage in one direction). The one-way clutch function could be used if desirable (or not at all).

Further, the switching device 18 is shown as a combined system in FIG. 1 of the dynamic controllable clutch 20 and the electric friction clutch 22. These components of the switching device 18 could, however, be separated into standalone systems, that is, a standalone dynamic controllable clutch system and a standalone electric friction clutch system.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:

1. An architecture for coupling a prime mover output member from a prime mover to a driven device input member of a device to be driven thereby, the architecture comprising:
    an architecture input member configured to be connected to the prime mover output member;
    an architecture output member configured to be connected to the driven device input member;
    a torque transfer device defining an indirect coupling transferring torque therethrough, the torque transfer device having a torque transfer device output member connected to the architecture output member;
    a direct drive connection member providing a direct coupling transferring torque therethrough, the direct drive connection member being connected to the architecture output member of the architecture; and
    a dynamically controllable clutch connected to the architecture input member and being selectively and alternately coupled to rotationally drive one of the torque transfer device and the direct drive connection member;
    whereby when the dynamically controllable clutch is coupled to the torque transfer device, the torque transfer device is rotatably driven by the architecture input member and the architecture output member is rotatably driven by the torque transfer device, when the dynamically controllable clutch is coupled to the direct drive connection member the direct drive connection member is driven by the architecture input member, the architecture output member is rotatably driven by the direct drive connection member and the torque transfer device is rotatably disconnected from the architecture input member and undriven; and
    wherein the dynamically controllable clutch includes an actuator, a first set of locking elements and a second set of locking elements, in a first condition the actuator engaging the first set of locking elements with an indirect drive connection member and rotationally driving the torque transfer device, in a second condition the actuator engaging the second set of locking elements and rotationally driving the direct drive connection member, the first set of locking elements being disengaged from the indirect drive connection member in the second condition, the second set of locking elements being disengaged from the direct drive connection member in the first condition.

2. The architecture according to claim 1, wherein the first and second sets of locking elements mechanically engage with the indirect drive connection member and the direct drive connection member, respectively.

3. An architecture for coupling a prime mover output member from a prime mover to a driven device input member of a device to be driven thereby, the architecture comprising:
    an architecture input member configured to be connected to the prime mover output member;
    an architecture output member configured to be connected to the driven device input member;
    a torque transfer device defining an indirect coupling transferring torque therethrough, the torque transfer device having a torque transfer device output member connected to the architecture output member;
    a direct drive connection member providing a direct coupling transferring torque therethrough, the direct drive connection member being connected to the architecture output member of the architecture; and
    a dynamically controllable clutch connected to the architecture input member and being selectively and alternately coupled to rotationally drive one of the torque transfer device and the direct drive connection member;
    whereby when the dynamically controllable clutch is coupled to the torque transfer device, the torque transfer device is rotatably driven by the architecture input member and the architecture output member is rotatably driven by the torque transfer device, when the dynamically controllable clutch is coupled to the direct drive connection member the direct drive connection member is driven by the architecture input member, the architecture output member is rotatably driven by the direct drive connection member and the torque transfer device is rotatably disconnected from the architecture input member and undriven; and
    an electric friction clutch coupled between the dynamically controllable clutch and a torque transfer input of the torque transfer device.

4. The architecture according to claim 3, wherein the electric friction clutch is configured to selectively and frictionally couple the torque transfer device to a portion of the dynamically controllable clutch and to cause the torque transfer device to rotate at a speed within a predetermined speed differential relative to a rotational speed of the architecture input member or the direct drive connection member and permitting re-engagement of the torque transfer device and the architecture input member via the dynamically controllable clutch over an operational range.

5. The architecture according to claim 3, wherein the electric friction clutch includes a first set of friction plates and a second set of friction plates, a translator configured to compress the first and second sets of friction plates against one another and an actuator configured to cause the translator to compress the first and second sets of friction plates.

6. The architecture according to claim 5, wherein one of the first and second sets of friction plates is supported by the dynamically controllable clutch and rotatable therewith, the other of the first and second sets of friction plates is supported by the indirect drive connection member and rotatable therewith.

7. An architecture for coupling a prime mover output member from a prime mover to a driven device input member of a device to be driven thereby, the architecture comprising:
    an architecture input member configured to be connected to the prime mover output member;
    an architecture output member configured to be connected to the driven device input member;

a torque converter having a rotatable cover enclosing an impeller and a turbine, the impeller and turbine defining a fluid coupling for transferring torque therethrough, the torque converter having a torque converter output member connected to the architecture output member;

a direct drive connection member connected to the architecture output member and defining a mechanical coupling for transferring torque to the architecture output member; and a dynamically controllable clutch located exteriorly of the rotatable cover of the torque converter, the dynamically controllable clutch including an actuator, the dynamically controllable clutch being connected to the architecture input member and being selectively and alternately coupled to rotationally drive the torque converter in a first position of the actuator and the direct drive connection member in a second position of the actuator;

whereby when the dynamically controllable clutch is coupled to the torque converter, the torque converter is rotatably driven by the architecture input member and the architecture output member is rotatably driven by the torque converter output member, when the dynamically controllable clutch is coupled to the direct drive connection member the direct drive connection member is driven by the architecture input member, the architecture output member is rotatably driven by the direct drive connection member and the torque converter is rotatably disconnected from the architecture input member and undriven.

8. The architecture according to claim 7, wherein the dynamically controllable clutch includes the actuator, a first set of locking elements and a second set of locking elements, in the first position the actuator mechanically engaging the first set of locking elements with an indirect drive connection member and rotationally driving the torque converter, in the second position the actuator mechanically engaging the second set of locking elements and rotationally driving the direct drive connection member, the first set of locking elements being disengaged from the indirect drive connection member in the second condition, the second set of locking elements being disengaged from the direct drive connection member in the first condition.

9. The architecture according to claim 7, further comprising an electric friction clutch coupled between the dynamically controllable clutch and an input member of the torque converter.

10. The architecture according to claim 9, wherein the electric friction clutch is configured to selectively and frictionally couple the torque converter to a portion of the dynamically controllable clutch and to cause the torque converter to rotate at a speed within a predetermined speed differential relative to a rotational speed of the architecture input member or the direct drive connection member and permitting re-engagement of the torque converter and the architecture input member via the dynamically controllable clutch over an operational range.

11. The architecture according to claim 9, wherein the electric friction clutch includes a first set of friction plates and a second set of friction plates, a translator configured to compress the first and second sets of friction plates against one another and an actuator configured to cause the translator to compress the first and second sets of friction plates.

12. The architecture according to claim 11, wherein one of the first and second sets of friction plates is supported by the dynamically controllable clutch and rotatable therewith, the other of the first and second sets of friction plates is supported by the indirect drive connection member and rotatable therewith.

13. An architecture for coupling a prime mover output member from a prime mover to a driven device input member of a device to be driven thereby, the architecture comprising:

an architecture input member configured to be connected to the prime mover output member;

an architecture output member configured to be connected to the driven device input member;

a torque converter having an impeller and a turbine defining a fluid coupling for transferring torque therethrough, the torque converter having a torque converter output member connected to the architecture output member;

a direct drive connection member connected to the architecture output member and defining a mechanical coupling for transferring torque to the architecture output member; and a dynamically controllable clutch connected to the architecture input member and being selectively and alternately mechanically coupled to rotationally drive one of the torque converter and the direct drive connection member;

an electric friction clutch coupled between the dynamically controllable clutch and a torque converter input of the torque converter, the electric friction clutch including a first set of friction plates and a second set of friction plates, a translator configured to compress the first and second sets of friction plates against one another, one of the first and second sets of friction plates being supported by the dynamically controllable clutch and rotatable therewith, the other of the first and second sets of friction plates being supported by an indirect drive connection member and rotatable therewith; and whereby when the dynamically controllable clutch is coupled to the torque converter, the torque converter is rotatably driven by the architecture input member and the architecture output member is rotatably driven by the torque converter output member, when the dynamically controllable clutch is coupled to the direct drive connection member the direct drive connection member is driven by the architecture input member, the architecture output member is rotatably driven by the direct drive connection member and the torque converter is rotatably disconnected from the architecture input member and undriven.

14. The architecture according to claim 13, wherein the electric friction clutch is configured to selectively and frictionally couple the torque converter to a portion of the dynamically controllable clutch and to cause the torque converter to rotate at a speed within a predetermined speed differential relative to a rotational speed of the architecture input member or the direct drive connection member and permitting re-engagement of the torque converter and the architecture input member via the dynamically controllable clutch over an operational range.

15. The architecture according to claim 13, wherein the dynamically controllable clutch includes an actuator, a first set of locking elements and a second set of locking elements, in a first condition the actuator mechanically engaging the first set of locking elements with the indirect drive connection member and rotationally driving the torque converter, in a second condition the actuator mechanically engaging the second set of locking elements and rotationally driving the direct drive connection member, the first set of locking elements being disengaged from the indirect drive connection member in the second condition, the second set of locking elements being disengaged from the direct drive connection member in the first condition.

* * * * *